United States Patent
Choi et al.

(10) Patent No.: US 8,868,054 B2
(45) Date of Patent: Oct. 21, 2014

(54) METHOD AND SYSTEM FOR RESTORING TRANSFERRED MOBILE TERMINAL BY MOBILE TRANSFER SERVICE

(75) Inventors: Jong-Hyuk Choi, Seoul (KR); Jong-Il Park, Seoul (KR); Takeshi Tsukagoshi, Tokyo (JP); Yuji Hirano, Tokyo (JP); Yasuhisa Nakamura, Tokyo (JP); Akiko Yano, Tokyo (JP)

(73) Assignee: KT Corporation, Gyeonggi-do (KR)

( * ) Notice: Subject to any disclaimer, the term of this patent is extended or adjusted under 35 U.S.C. 154(b) by 622 days.

(21) Appl. No.: 13/129,807

(22) PCT Filed: Nov. 17, 2009

(86) PCT No.: PCT/KR2009/006758
§ 371 (c)(1),
(2), (4) Date: May 17, 2011

(87) PCT Pub. No.: WO2010/056088
PCT Pub. Date: May 20, 2010

(65) Prior Publication Data
US 2011/0230177 A1    Sep. 22, 2011

(30) Foreign Application Priority Data
Nov. 17, 2008    (KR) .................. 10-2008-0114219

(51) Int. Cl.
*H04M 3/00* (2006.01)
*H04M 1/00* (2006.01)
*H04M 3/42* (2006.01)

(52) U.S. Cl.
USPC ........................... 455/418; 455/417; 455/558

(58) Field of Classification Search
USPC ....................................................... 455/418
See application file for complete search history.

(56) References Cited

U.S. PATENT DOCUMENTS 8,412,185 B2 *   4/2013   Cader et al. ............... 455/426.1
2008/0064443 A1  3/2008   Shin et al.

FOREIGN PATENT DOCUMENTS

CN          101087336 A     12/2007
(Continued)

OTHER PUBLICATIONS

International Search Report dated Aug. 3, 2011 of PCT/KR2009/006758—4 pages.
(Continued)

*Primary Examiner* — Olumide T Ajibade Akonai
*Assistant Examiner* — Natasha Cosme
(74) *Attorney, Agent, or Firm* — IP Legal Services, LLC

(57) ABSTRACT

The present invention relates to a method and system for restoring a transferred mobile service by a mobile transfer service.
To this end, the present invention provides a method for restoring a mobile service that releases a mobile transfer state of a first mobile terminal when it is confirmed that a state where the power strength of a common pilot channel received from a second mobile terminal is a previously set threshold value or less is maintained for a previously set threshold time or more. In addition, the present invention provides a method for restoring mobile service that releases a mobile transfer state of the first mobile terminal when it is confirmed that the frequency of a period that is the power threshold value or less of the common pilot channel received from the second mobile terminal exceeds the previously set threshold frequency within the previously set time unit.
Further, the present invention provides a method for restoring mobile service that releases and restores the mobile transfer state of the first mobile terminal when the first mobile terminal is located in a service possible area and the second mobile terminal is located in a shadow area.
According to the present invention, a situation where mobile communication service subscribers do not receive important mobile communication service can be prevented from occurring, which is caused by not performing a procedure of restoring the transferred mobile terminal.

18 Claims, 6 Drawing Sheets

(56) References Cited

FOREIGN PATENT DOCUMENTS

| JP | 2007-235841 A | 9/2007 |
|---|---|---|
| JP | 2007-266900 A | 10/2007 |
| JP | 2008-079035 A | 4/2008 |
| JP | 2008-193450 A | 8/2008 |
| KR | 10-2000-0041930 A | 7/2000 |
| KR | 10-0540569 B1 | 3/2006 |
| KR | 10-2007-0077535 A | 7/2007 |
| WO | 2004-036942 A1 | 4/2004 |

OTHER PUBLICATIONS

Written Opinion dated Aug. 3, 2011 of PCT/KR2009/006758—3 pages.
State Intellectual Property Office of the Peoples Republic of China, Search Report for Chinese Patent Application No. 200980145572.6, May 11, 2013.

* cited by examiner

METHOD AND SYSTEM FOR RESTORING TRANSFERRED MOBILE TERMINAL BY MOBILE TRANSFER SERVICE

TECHNICAL FIELD

The present invention relates to a method and system for restoring service to a transferred mobile terminal by a mobile transfer service. In particular, the present invention relates to a method for restoring service to a first mobile terminal that has been transferred to a second mobile terminal to an original state in a mobile terminal transfer service that transfers a mobile communication service provided to any specific mobile terminal (hereinafter referred to as "first mobile terminal") to another mobile terminal (hereinafter "second mobile terminal"), and a system thereof.

BACKGROUND ART

In current or prior arts, in order to transfer all profiles of a currently used mobile terminal to a new mobile terminal, a procedure for renewing a subscription of a new terminal or canceling the original subscription and making a new subscription for the new device is required, which has a permanent characteristic, not a temporary characteristic. In addition, in order to restore a profile to an original state after the profile is transferred, the same procedure should be repeated in an opposite manner.

Meanwhile, with the advent of a third generation mobile communication service that performs user authentication using a smart card, a mobile subscriber can change and use mobile devices by inserting the smart card, which is also known as SIM or USIM, into the new devices. However, the procedure is inconvenient because the mobile subscriber has to manually separate the smart card from the mobile terminal and install it in another mobile terminal, as described above. Therefore, in order to solve the inconvenience, a scheme that is capable of freely receiving the mobile communication service in which a first mobile terminal is subscribed through a second mobile terminal is required, such that the mobile transfer service can be provided.

The mobile transfer service is a technology that uses various mobile communication services provided to the first mobile terminal through the second mobile terminal by temporarily setting a telephone number of the first mobile terminal to the second mobile terminal by a user using the first mobile terminal and the second mobile terminal. As a result, a voice/video communication call transmitted to the first mobile terminal is forwarded to the second mobile terminal, such that no mobile communication services can be provided through the first mobile terminal.

If a user moves out of a shadow area while receiving the mobile communication service, the mobile communication service is set to be provided to the transferred second mobile terminal from the first mobile terminal, so it is problematic that the user cannot receive a mobile telecommunication service even when the second mobile terminal is located in a shadow area (i.e. out of service area) and the first mobile terminal is located in the service area that can provide the mobile communication service.

In particular, if the first mobile terminal is a mobile telephone and the second mobile terminal is a telematics terminal mounted on a vehicle, when the vehicle is located in a shadow area such as an underground parking lot, while the user receives the mobile transfer service and moves to a possible area of the mobile communication service while carrying the mobile telephone without performing a procedure of returning the transferred first mobile terminal to an original state, the user cannot receive a mobile communication service until the transferred first mobile terminal is again restored to an original state. In other words, when the user using the mobile transfer service forgets to perform the restoring procedure of the transferred first mobile terminal and thus does not perform the restoring procedure, he/she cannot continuously receive the mobile communication service.

Therefore, when the user uses the mobile transfer service and then the second mobile terminal in which the forwarding reception is set is located in the shadow area, if the state that the second mobile terminal cannot receive the mobile communication service is maintained for a predetermined time, a need exists for an automatic restoring technology that can restore the first mobile terminal that is transferred to the second mobile terminal without performing a separate procedure to receive the mobile communication service.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a method for restoring a first mobile terminal to an original state by forcibly ending a mobile transfer service when a second mobile terminal receiving a mobile communication service using information of the first mobile terminal by the mobile transfer service is located in a shadow area for a predetermined time, and a system thereof.

Technical Solution

In order to achieve the above object, a method for restoring mobile service according to an exemplary embodiment of the present invention is a method for restoring service to a first mobile terminal that has been transferred to a second mobile terminal in a mobile transfer service receiving mobile communication services of the first mobile terminal through the second mobile terminal by setting a telephone number of the first mobile terminal to the second mobile terminal. The method for restoring mobile service includes: (a) confirming power strength of a common pilot channel received from the second mobile terminal; and (b) releasing and restoring the mobile service transfer state of the first mobile terminal when the state where the power strength of the common pilot channel is a set threshold value or less is maintained for a set threshold time or more.

A method for restoring mobile service according to another embodiment of the present invention is a method for restoring service to a first mobile terminal that has been transferred to a second mobile terminal in a mobile transfer service receiving mobile communication services of the first mobile terminal through the second mobile terminal by setting a telephone number of the first mobile terminal to the second mobile terminal. The method for restoring mobile service includes: (a) confirming power strength of a common pilot channel received from a second mobile terminal; and (b) releasing and restoring the mobile transfer state of the first mobile terminal when it is confirmed from the power strength of the common pilot channel that the state where the second mobile terminal cannot receive mobile communication services exceeds a set threshold frequency within a set time period.

A method for restoring mobile according to yet another embodiment of the present invention is a method for restoring service to a first mobile terminal that has been transferred to a second mobile terminal in a mobile transfer service receiving mobile communication services of the first mobile terminal through the second mobile terminal by setting a telephone number of the first mobile terminal to the second mobile terminal. The method for restoring mobile includes: (a) confirming locations of a first mobile terminal and a second mobile terminal; and (b) releasing and restoring the mobile transfer state of the first mobile terminal when the first mobile terminal is located in a service possible area and a second mobile terminal is a shadow area.

A mobile transfer system according to still another embodiment of the present invention is a system for a mobile transfer service that sets a telephone number of a first mobile terminal to a second mobile terminal to provide mobile communication services of the first mobile terminal through the second mobile terminal. The mobile transfer system includes: a switching center that processes commands for providing the mobile transfer service and processes commands for ending the mobile transfer service according to power strength of a common pilot channel received from the transferred second mobile terminal or locations of the first mobile terminal and the second mobile terminal; and a home location register that restores service profiles of the second mobile terminal transferred to service profiles of the first mobile terminal by the mobile transfer service and activates the deactivated service profiles of the first mobile terminal according to the commands for ending the mobile transfer service.

MODE FOR INVENTION

Figure 1:
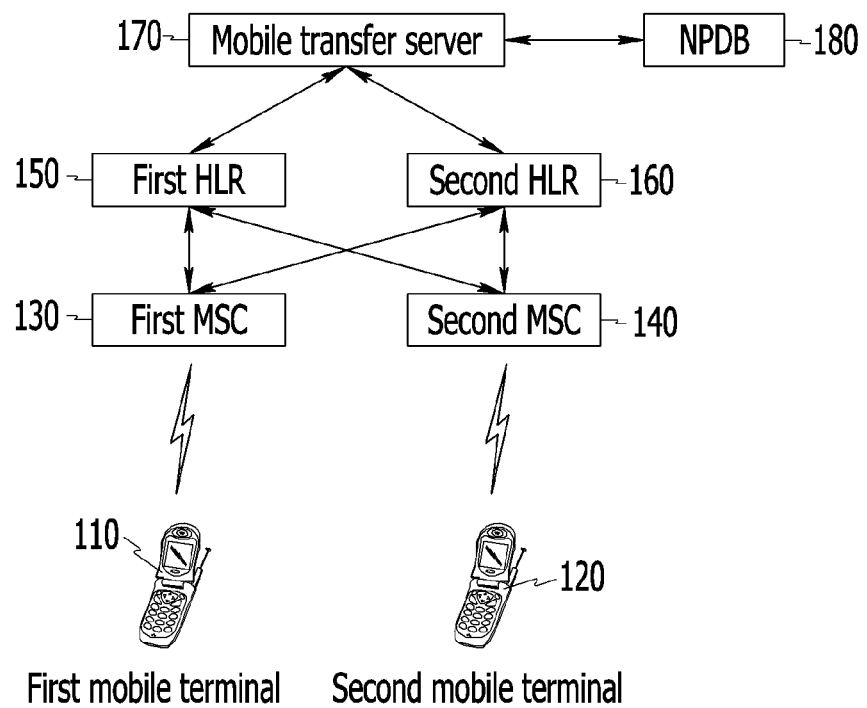
FIG. 1 is a diagram showing a network configuration of a mobile transfer service system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is a diagram showing a network configuration of a mobile transfer service system according to an exemplary embodiment of the present invention.

The mobile transfer service system according to an exemplary embodiment of the present invention includes a first mobile terminal 110, a second mobile terminal 120, and a first mobile switching center 130 (hereinafter referred to as "MSC") and a second MSC 140 each processing mobile communication services that are provided to the first mobile terminal 110 and the second mobile terminal 120, a first home location register 150 (hereinafter referred to as "HLR") and a second HLR 160 each receiving the first mobile terminal 110 and the second mobile terminal 120, a mobile transfer server 170 that controls mobile transfer processing, and a number portability database (hereinafter referred to as "NPDB") 180 that manages mapping data of international mobile station identity (IMSI) and mobile subscriber ISDN number (MSISDN) of the first mobile terminal 110 and the second mobile terminal 120.

The following description is given based on a case where mobile communication subscribers perform the mobile transfer to the second mobile terminal 120 during the use of the first mobile terminal 110 to receive the mobile communication services through the second mobile terminal 120 in which forwarding reception is set.

Herein, as the first mobile terminal 110 and the second mobile terminal 120 that can be used, any terminals that can transmit and receive voice/video call, character messages, etc., can be used without limitation. For example, they may be a PDA, a cellular phone, a PCS phone, a GSM phone, a W-CDMA phone, a CDMA-2000 phone, an MBMS phone, etc. Preferably, the second mobile terminal 120 may be a telematics terminal that is installed in a vehicle to receive the mobile communication services.

The following description is given based on a case where the first mobile terminal 110 is a mobile phone and the second mobile terminal 120 is a telematics terminal installed in a vehicle.

In order to use the terminal transfer service, the mobile communication subscribers input a code (e.g., *1111) that indicates the mobile transfer service, and a telephone number (i.e., MSISDN) of the first mobile terminal 110, which intends to perform the transfer setting, to the second mobile terminal 120 in which the forwarding reception is set, and then input previously set specific buttons or call buttons. According to the above-mentioned procedure, the information of the first mobile terminal 110 is deactivated in a mobile communication network to stop the receiving and sending, and the call processes related to the mobile communication services are performed through the second mobile terminal 120.

Each of the first mobile terminal 110 and the first MSC 130, and the second mobile terminal 120 and the second MSC 140, are connected to each other through a base station and a base station controller, and the first MSC 130 and the second MSC 140 perform basic and additional service processing, the receiving and sending call processing of the subscribers, location registration procedure and handoff procedure processing, an interworking function with other networks such as a public network or intelligent network system, etc. In particular, when the mobile terminal is set to be transferred by the mobile transfer service, the first MSC 130 performs the deactivation setting on a service profile of the first mobile terminal 110 to stop the receiving and sending of the first mobile terminal 110. In addition, the second MSC 140 changes the service profile of the second mobile terminal 120 to the service profile of the first mobile terminal 110 and changes the MSISDN of the second mobile terminal 120 to the MSISND of the first mobile terminal 110, such that calls to the first mobile terminal 110 are received by the second mobile terminal 120.

To the contrary, when the mobile transfer is released, the first MSC 130 activates the service profile of the first mobile terminal 110 and the second MSC 140 restores the service profile of the second mobile terminal 120.

The second MSC 140 confirms receive signal code power (hereinafter referred to as "RSCP") through a common pilot channel (CPICH) that is transmitted and received from and to the second mobile terminal 120. In addition, the second MSC 140 previously sets and stores the RSCP threshold value used as a determination criterion for releasing the mobile transfer according to the exemplary embodiment of the present invention, and when the RSCP confirmed through the communication with the second mobile terminal 120 is below the previously set RSCP threshold value, performs a function that generates the mobile transfer release request message and transmits it to the first HLR 150 and the second HLR 160.

Moreover, the first MSC 130 and the second MSC 140 perform a function that confirms whether the first mobile terminal 110 and the second mobile terminal 120 are located in a shadow area or whether the first mobile terminal 110 and the second mobile terminal 120 are located in a mobile communication service possible area, by the interworking with a location based service (LBS) server (not shown) that provides the location information of the mobile terminal or by the confirmation of the RSCP through the common pilot channel. Also, the first MSC 130 and the second MSC 140 perform a function of releasing the terminal transfer state according to the confirmed locations of the first mobile terminal 110 and the second mobile terminal 120.

The first HLR 150 and the second HLR 160, which are databases storing service profiles regarding the subscriber information of the first mobile terminal 110 and the second mobile terminal 120, store various information necessary for identification numbers (ISDN, MSISDN, etc.), additional service information, location information, and mobile transfer service of the mobile terminals 110 and 120.

Preferably, when the mobile transfer is performed, the first HLR 150, which plays a role of the first mobile terminal 110, indicates the transfer to the second mobile terminal 120 on the information of the first mobile terminal 110, stores and manages the information of the second MSC 140 and/or a serving GPRS support node (SGSN) (not shown) in which the second mobile terminal 120 is located, and manages the system data of the second HLR 160 that receives the second mobile terminal 120. To the contrary, when the terminal transfer is released, the first HLR 150, which receives the first mobile terminal 110, erases the terminal transfer information and restores it to an original state.

Meanwhile, when the terminal transfer is performed, the second HLR 160 indicates on the information of the second mobile terminal 120 that the mobile transfer is performed from the first mobile terminal 110 and manages it.

When the terminal transfer is released, the second HLR 160 erases the mobile transfer information indicated on the subscriber information of the second mobile terminal 120. The terminal transfer information stored in the second HLR 160 is used when the second mobile terminal 120 is located and registered in the mobile transfer state.

The mobile transfer server 170 stores and manages the terminal transfer service subscriber information and performs the terminal transfer service logic. In other words, the mobile transfer server 170 plays a role of generating a mobile transfer command message or a mobile transfer release command message according to a service code of a message transmitted from the first HLR 150 and the second HLR 160, and then transmits them to the NPDB 180. At this time, in generating the mobile transfer command message or the mobile transfer release command message in the mobile transfer server 170, the mobile transfer server 170 includes the MSISDN of the first mobile terminal 110.

Further, when the mobile transfer server 170 receives the mobile transfer release request from the first HLR 150 and the second HLR 160 according to the exemplary embodiment of the present invention, it plays a role of generating the mobile transfer release command message and transmits it to the NPDB 180.

The NPDB 180 stores and manages the mapping data of the IMSI and MSISDN of the first mobile terminal 110, and when it receives the mobile transfer command message or the mobile transfer release command message that are transmitted from the mobile transfer server 170, it searches the IMSI using the MSISDN of the first mobile terminal 110 that is included in the message, and substitutes the MSISDN of the first mobile terminal 110 that is included in the message with the searched IMSI, and transmits it to the first HLR 150 and the second HLR 160 to perform the mobile transfer setting or the mobile transfer release.

Herein, in describing a configuration of the mobile transfer service system according to the exemplary embodiment of the present invention, the mobile transfer server 170 and the NPDB 180 are described as separate constituent elements, but since the NPDB 180 is a constituent element that performs a function of managing the mapping data of the MSISDN and IMSI of the mobile terminal, the mobile transfer server 170 and the NPDB 180 can be integrally configured as one constituent element. At this time, the only NPDB 180 is used as the database and the mobile transfer server 170 can be configured to perform the function of the above-mentioned NPDB 180 together. For convenience of explanation, the following description will be given based on the case where the mobile transfer server 170 and the NPDB 180 are separately configured.

In the above-mentioned mobile transfer service system, the first MSC 130 and the second MSC 140 can restore the transferred mobile service using the RSCP figure of the common pilot channel received from the mobile terminal and can restore the transferred terminal using the location information of the first mobile terminal 110 and the second mobile terminal 120 that are confirmed through the location based service server, etc.

In the mobile transfer service system that restores the transferred mobile using the RSCP figure of the common pilot channel, the first MSC 130 and the second MSC 140 confirm the RSCP through the common pilot channel that is transmitted and received to and from the mobile terminal, and when the confirmed RSCP figure is below the previously set RSCP threshold value, performs a role of restoring the transferred mobile.

As described above, in order to request the mobile transfer release, when comparing the RSCP figure received from the mobile terminal with the previously set RSCP threshold value, a first method that determines whether the case where the received RSCP figure maintains a value of the RSCP threshold value or less is maintained for a previously set threshold time, and a second method that confirms that a frequency that the received RSCP figure has is a value of the RSCP threshold value or less for a previously set specific time can be used.

In the mobile transfer service system that restores the transferred mobile using the location information of the first mobile terminal 110 and the second mobile terminal 120, the first MSC 130 and the second MSC 140 confirm the locations of the first mobile terminal 110 and the second mobile terminal 120 to perform a role of restoring the transferred mobile service when the second mobile terminal 120 is located in a shadow area and the first mobile terminal 110 is located in a service possible area.

Figure 2:
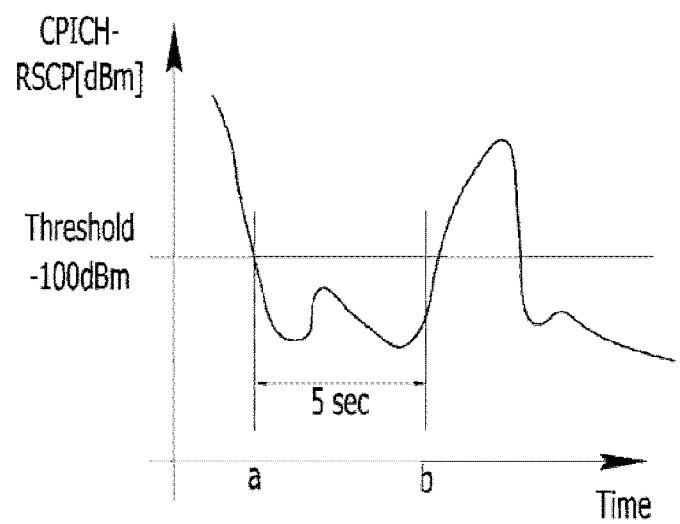
FIGS. 2 and 3 are diagrams showing examples of RSCP figure graphs of a common pilot channel received from a mobile terminal when a mobile transfer release is performed by maintaining the RSCP figure received from a mobile terminal at an RSCP threshold value or less for a previously set threshold time, according to a first embodiment of the present invention.
Figure 3:
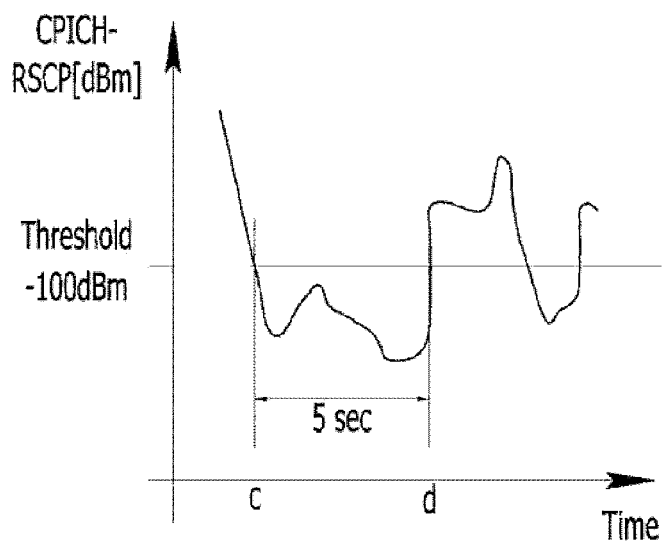

FIGS. 2 and 3 are diagrams showing examples of RSCP figure graphs of a common pilot channel received from a mobile terminal when a mobile transfer release is performed by maintaining the RSCP figure received from a mobile terminal at an RSCP threshold value or less for a previously set threshold time, according to a first embodiment of the present invention.

The second MSC 140 of the mobile transfer service system according to the exemplary embodiment of the present invention performs the mobile transfer and performs an operation of switching the common pilot channel with the second mobile terminal 120, in which the MSISDN of the first mobile terminal 110 is set, in the previously set time unit.

The second MSC 140 confirms the RSCP figure of the common pilot channel received from the second mobile terminal 120. When it is confirmed that the RSCP figure has a form as shown in FIG. 2 in the second MSC 140, the second MSC 140 performs a role of restoring the first mobile terminal 110 transferred to the second mobile terminal 120 according to the exemplary embodiment of the present invention.

FIGS. 2 and 3 show examples of a case used as a reference of releasing the mobile transfer when the threshold time is 5 seconds or more in the situation where the RSCP threshold value is −100 dBm and the RSCP figure received from the second mobile terminal 120 is −100 dBm or less.

According to the performance of the mobile transfer, when the second MSC 140 communicating with the second mobile terminal 120, in which the MSISDN of the first mobile terminal 110 is set, confirms that the RSCP figure received from the second mobile terminal 120 indicates the graph of the form as shown in FIG. 2, the second MSC 140 confirms that the RSCP figure graph received from the second mobile terminal 120 has a value of −100 dBm or less that is the previously set RSCP threshold value between "a" and "b" areas and the previously set threshold time between "a" and "b" is 5 seconds or more, and thus transmits the mobile transfer release request to the mobile transfer server 170 through the second HLR 160.

In addition, when the second MSC 140 communicating with the second mobile terminal 120 confirms that the RSCP figure received from the second mobile terminal 120 indicates the graph of the form as shown in FIG. 3, the second MSC 140 confirms that the RSCP graph received from the second mobile terminal 120 has a value of −100 dBm or less that is the previously set RSCP threshold value between "c" and "d" areas and the previously set threshold time between "c" and "d" is 5 seconds or more, and thus transmits the mobile transfer release request to the mobile transfer server 170 through the second HLR 160.

Herein, FIG. 2 shows an example of the RSCP figure graph in the case where the second mobile terminal 120 is continuously located in a shadow area after the previously set threshold time, that is, "b" and FIG. 3 is an example of the RSCP figure graph in the case where the second mobile terminal 120 is out of a shadow area after the threshold time, that is, "d".

Figure 4:
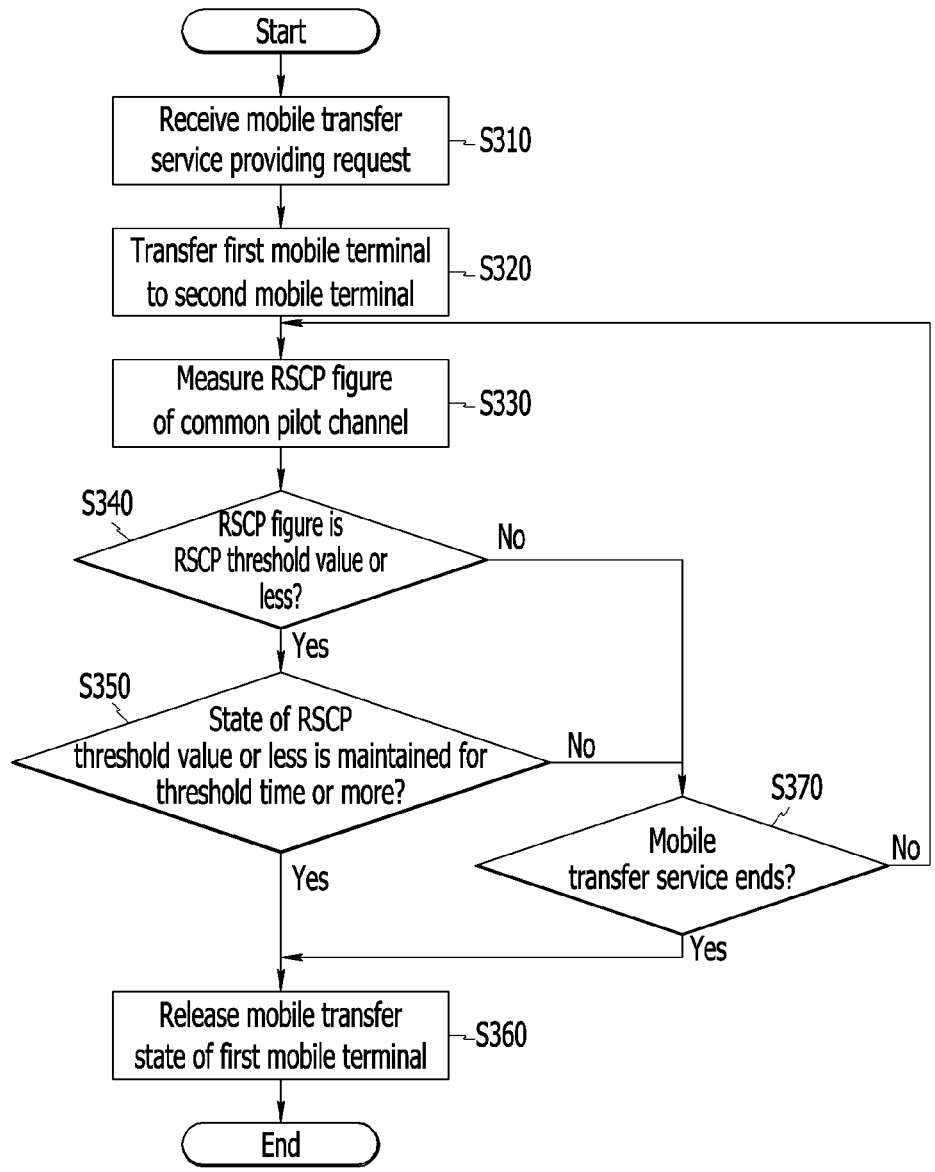
FIG. 4 is a flowchart for explaining a mobile transfer release method when the RSCP figure of the common pilot channel received from the mobile terminal is maintained at an RSCP threshold value or less for a previously set threshold time, according to a first embodiment of the present invention.

FIG. 4 is a flowchart for explaining a mobile transfer release method when the RSCP figure of the common pilot channel received from the mobile terminal is maintained at an RSCP threshold value or less for a previously set threshold time, according to a first embodiment of the present invention. By the mobile transfer service, the user who wants to receive the mobile communication services to be provided to the first mobile terminal 110 through the second mobile terminal 120 uses key buttons set in the second mobile terminal 120 to request the mobile transfer service. At this time, in requesting the mobile transfer service, a method of inputting a code (e.g., *1111) indicating the mobile transfer service to the second mobile terminal 120 and then inputting the telephone number (i.e., MSISDN) of the first mobile terminal 110 to be transferred and inputting the call buttons can be used (S310).

The second MSC 140, which receives the mobile transfer service code from the second mobile terminal 120, the telephone number of the first mobile terminal 110, and the telephone number of the second mobile terminal 120, transmits the received mobile transfer service code and the mobile information to the mobile transfer server 170 through the second HLR 160 by confirming the reception of the mobile transfer service code.

The mobile transfer server 170, which receives the mobile transfer service code, the telephone number of the first mobile terminal 110, and the telephone number of the second mobile terminal 120 through the second HLR 160, generates the mobile transfer command message and transmits it the NPDB 180, and the NPDB 180 sets the MSISDN of the received first mobile terminal 110 to the second mobile terminal 120 to perform the mobile transfer operation (S320).

According to the completion of the mobile transfer operation, the user uses the mobile communication services that are to be provided to the first mobile terminal 110 through the second mobile terminal 120. At this time, the second MSC 140, which plays a role of the second mobile terminal 120, periodically transmits and receives the common pilot channel to and from the second mobile terminal 120. The second MSC 140 confirms the RSCP figure of the second mobile terminal 120 through the common pilot channel received from the second mobile terminal 120 (S330).

If the second MSC 140 compares the received RSCP figure with the previously set RSCP threshold value and confirms that the received RSCP figure has a value of the RSCP threshold value or less according to the comparison result (S340), it confirms a time that the state having a value of the RSCP threshold value or less is maintained (S350).

When the state where the received RSCP figure has the RSCP threshold value or less is maintained for the previously set threshold time or more, the second MSC 140 generates the mobile transfer release request message and transmits it to the mobile transfer server 170 through the second HLR 160, and the mobile transfer server 170 generates the terminal transfer release command message and transmits it to the NPDB 180.

The NPDB 180 receiving the mobile transfer release command message releases the MSISDN of the first mobile terminal 110 that is set in the second mobile terminal 120 and transmits the mobile transfer release result to the first HLR 150 and the second HLR 160 to perform the mobile transfer release.

The first HLR 150 and the second HLR 160 erase the mobile transfer information of the first mobile terminal 110 according to the received terminal transfer release result, such that the first mobile terminal 110 can normally receive the mobile communication services by the mapping data of the original MSISDN and the IMSI (S360).

Herein, at steps S340 and S350, when the received RSCP figure maintains the previously set RSCP threshold value or more or although it has a value of the RSCP threshold value or less, and is restored to the state of the RSCP threshold value or more within the previously set threshold time, it continuously maintains the terminal transfer state and provides the mobile communication services to the second mobile terminal 120 to which the telephone number of the first mobile terminal 110 is mapped.

Meanwhile, if the code (e.g., *1112) indicating the release of the mobile transfer service from the second mobile terminal 120 is input during the provision of the above-mentioned mobile transfer service, the input mobile transfer service release code is transferred to the NPDB 180 and the NPDB 180 releases the MSISDN of the first mobile terminal 110 that is set in the second mobile terminal 120 to perform the operation that performs the mobile transfer release (S370).

According to the above-mentioned method, when the state where the RSCP figure received from the second mobile terminal 120, in which the mobile transfer is set, is the previously set RSCP threshold value or less and is maintained at the previously set threshold time or more, the mobile transfer service automatically ends and the mobile transfer state is released, such that the first mobile terminal 110 can be restored to the state of providing the mobile communication services.

Figure 5:
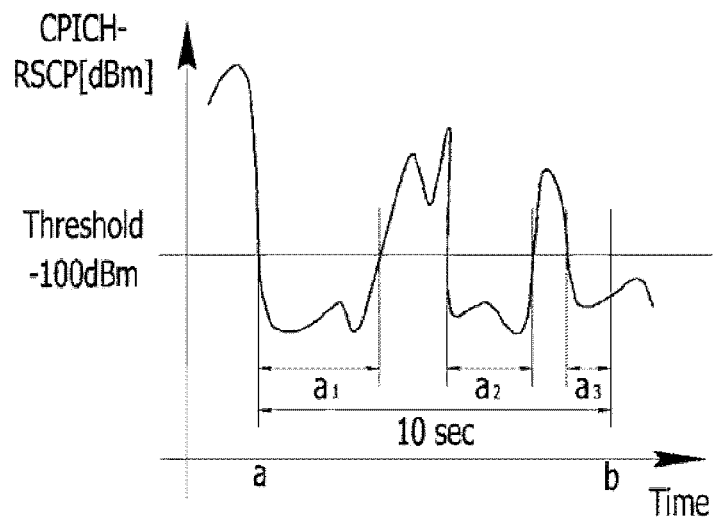
FIGS. 5 and 6 are diagrams showing examples of the RACP figure graph of the common pilot channel received from the mobile terminal when a frequency that the RSCP figure has received from the mobile terminal is an RSCP threshold value or less for a previously set threshold time that is a previously set threshold frequency or more, according to a second embodiment of the present invention.
Figure 6:
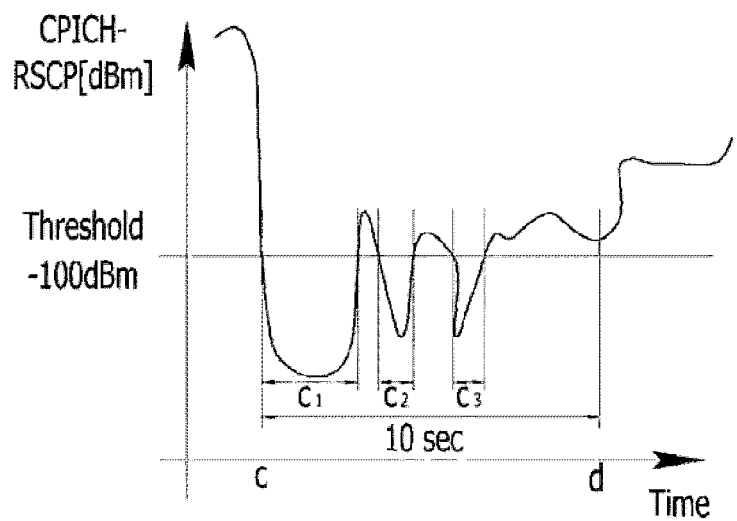

FIGS. 5 and 6 are diagrams showing an example of the RACP figure graph of the common pilot channel received from the mobile terminal, when a frequency that the RSCP figure has received from the mobile terminal has an RSCP threshold value or less and a previously set threshold time is a previously set threshold frequency or more, according to a second embodiment of the present invention.

The mobile transfer service system according to the exemplary embodiment of the present invention performs the mobile transfer to perform the operation of restoring the transferred first mobile terminal 110 when the RSCP figure of the common pilot channel received from the second mobile terminal 120, in which the MSISDN of the first mobile terminal 110 is set, indicates the form shown in FIG. 5.

In FIGS. 5 and 6, for when the case where the RSCP threshold value is −100 dBm or less is generated within 10 seconds three times or more, the mobile transfer service system set to perform the mobile transfer release operation will be described as an example.

According to the performance of the mobile transfer, when the RSCP figure received from the second mobile terminal 120, in which the MSISND of the first mobile terminal 110 is set, has the graph as shown in FIG. 5, the second MSC 140 confirms the change for the previously set threshold time, that is, 10 seconds, by using the RSCP figure graph received from the second mobile terminal 120. Since a period of a value of −100 dBm or less that is the RSCP threshold value set between "a" and "b" according to the result confirming the change in the RSCP figure graph between "a" and "b" in FIG. 5 is a total of three times such as a1, a2, and a3, the second MSC 140 transmits the mobile transfer release request to the mobile transfer server 170 through the second HLR 160.

In addition, when the second MSC 140 communicating with the second mobile terminal 120 confirms the RSCP figure having the form as shown in FIG. 6, in the RSCP figure graph received from the second mobile terminal 120, a number of periods of a value of −100 dBm or less that is the RSCP threshold value between "c" and "d" is a total of three as shown by c1, c2, and c3. Therefore, the second MSC 140 transmits the mobile transfer release request to the mobile transfer server 170 through the second HLR 160.

Herein, FIG. 5 shows an example of the graph of the RSCP figure in the case where the second mobile terminal 120 is continuously located in a shadow area after the threshold time, that is, "b" and FIG. 6 shows an example of the RSCP figure graph in the case where the second mobile terminal 120 is out of a shadow area after the threshold time, that is, "d".

Figure 7:
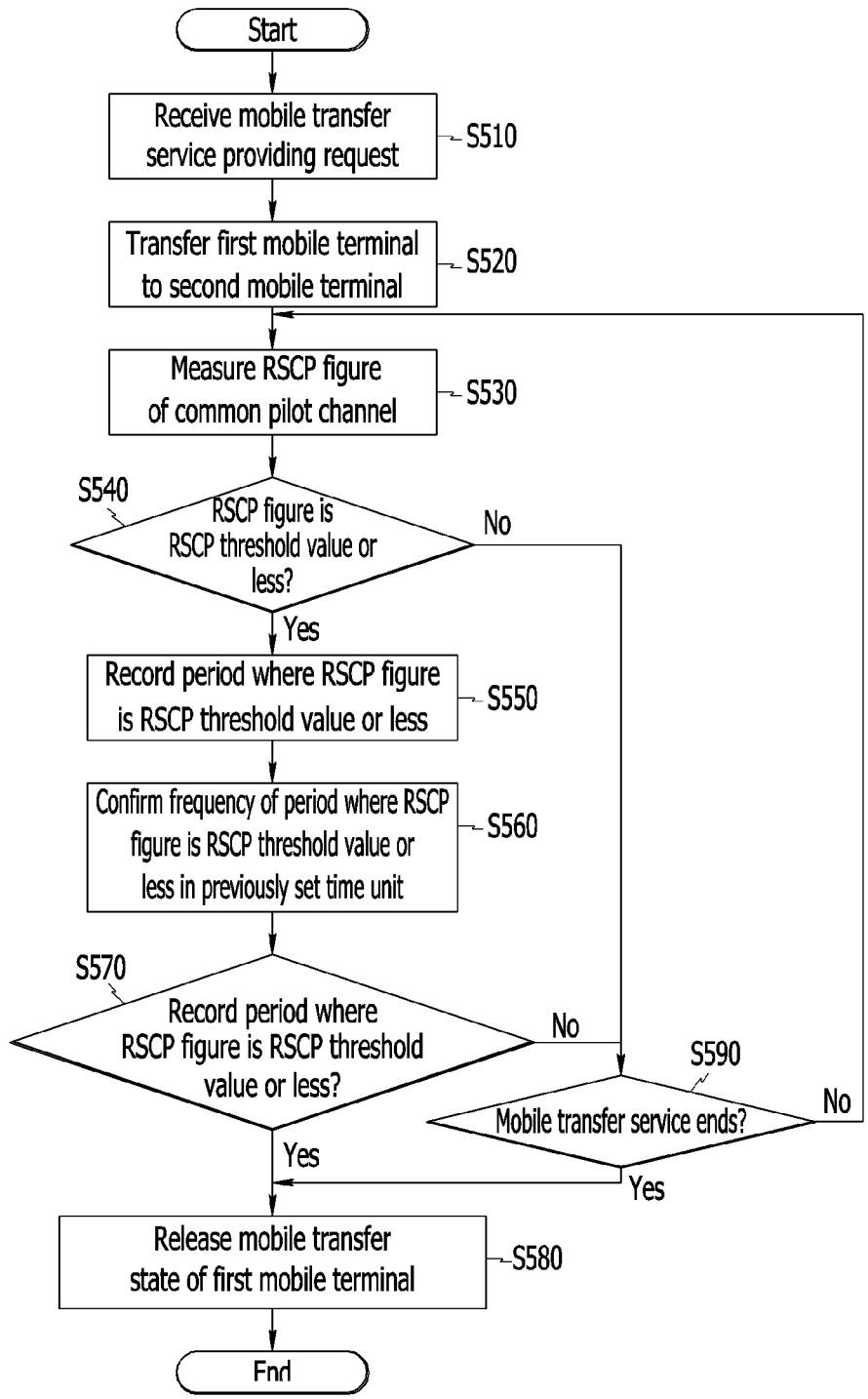
FIG. 7 is a flowchart for explaining a mobile transfer release method when a frequency that the RSCP figure of the common pilot channel has received from the mobile terminal is an RSCP threshold value or less for a previously set threshold time that is a previously set threshold frequency or more, according to the second embodiment of the present invention.

FIG. 7 is a flowchart for explaining a mobile transfer release method when a frequency that the RSCP figure of the common pilot channel received from the mobile terminal has an RSCP threshold value or less for a previously set threshold time is a previously set threshold frequency or more, according to the second embodiment of the present invention.

According to the second exemplary embodiment of the present invention, in order for the second mobile terminal 120 to request the mobile transfer service, the previously set mobile transfer service code and the telephone number (MSISDN) of the first mobile terminal 110 are input, and when the mobile transfer according to the input of the mobile transfer service code is set in the NPDB 180, steps S510 to S530 where the second MSC 140 provides the mobile communication services to be provided to the first mobile terminal 110 through the second mobile terminal 120 while confirming the RSCP figure of the common pilot channel received from the second mobile terminal 120 are the same as steps S310 to S330 as described above, and therefore the detailed description thereof will be omitted.

The second MSC 140 compares the RSCP figure received from the second mobile terminal 120 with the previously set RSCP threshold value, and when the period of the RSCP threshold value or less is confirmed (S540), records the confirmed period (S550).

The second MSC 140 confirms the frequency of the period that is the RSCP threshold value or less during the previously set time interval. For example, as shown in FIGS. 5 and 6, when the threshold time is previously set to 10 seconds, it confirms the frequency recorded in a period of the RSCP threshold value or less for a period of the previous 10 seconds (S560).

It confirms whether the frequency of the period of the confirmed RSCP threshold value or less reaches the previously set threshold frequency. For example, as shown in FIGS. 5 and 6, when the threshold frequency is previously set three times, it confirms whether the frequency of the period of the confirmed RSCP threshold value or less exceeds three times (S570).

When the frequency of the period of the confirmed RSCP threshold value or less reaches the previously set threshold frequency, the second MSC 140 generates the mobile transfer release request message and transmits it to the NPDB 180 through the second HLR 160 and the mobile transfer server 170.

The NPDB 180 receiving the mobile transfer release command message releases the MSISDN of the first mobile terminal 110 that is set in the second mobile terminal 120, such that the first mobile terminal 110 can use the mapping data of the normal MSISDN and IMSI to receive the mobile communication services (S580).

At steps S540 and S570, when the received RSCP figure maintains the previously set RSCP threshold value or more or the period having the RSCP threshold value or less within the threshold time is the previously set threshold frequency or less, it continuously maintains the mobile transfer state and provides the mobile communication services to the second mobile terminal 120 to which the telephone number of the first mobile terminal 110 is mapped.

If the mobile transfer service release code from the second mobile terminal 120 is input during the use of the mobile transfer service, the NPDB 180 releases the MSISDN of the first mobile terminal 110 that is set in the second mobile terminal 120 to perform the operation that performs the mobile transfer release (S590).

With the above-mentioned method, when the frequency that the RSCP figure received from the second mobile terminal 120 that performs the mobile transfer service has the value of the RSCP threshold value or less for the previously set threshold time is the previously set threshold frequency or more, the mobile transfer service is automatically released, thereby making it possible to restore the first mobile terminal 110 to the state that can provide the mobile communication service.

In actually implementing the mobile transfer service system according to the exemplary embodiment of the present invention, the first method that releases the mobile terminal when the received RSCP figure is maintained at a value of the RSCP threshold value or less for the threshold time and the second method that releases the mobile transfer when the frequency that the received RSCP figure has a value of the RSCP threshold value or less for the threshold time is the previously set threshold frequency or more can be implemented to be simultaneously applied.

In other words, when the received RSCP figure maintains the state of the RSCP threshold value or less for the previously set threshold time or more or although it is not maintained for the threshold time or more, and it exceeds the previously set threshold frequency, it can be set to release the mobile transfer state.

In the above description, in releasing the mobile transfer state when the RSCP figure received according to the first exemplary embodiment of the present invention is maintained at the RSCP threshold value or less for the threshold time, the mobile transfer state is released or the frequency that the RSCP figure received according to the second exemplary embodiment of the present invention has the value of the RSCP threshold value or less for a threshold time is the previously set threshold frequency or more, if the mobile transfer state release condition is satisfied, it can immediately perform the mobile transfer state release operation, and after the mobile transfer state release condition is satisfied, it can set to perform the mobile transfer state release operation at the time when the previously set specific time elapses.

Herein, after the mobile transfer condition is satisfied, when it is set to perform the mobile transfer state release operation at the time when the previously set specific time elapses, it again confirms whether the second mobile terminal 110 including the MSISDN of the first mobile terminal 110 is located in the shadow area at the time when the mobile transfer state release operation starts to additionally set a secondary condition that can determine the progress or termination of the mobile transfer state release operation.

For example, according to the first exemplary embodiment of the present invention, when the graph according to the RSCP figure received from the second mobile terminal 120 is the same as one shown in FIGS. 2A and 2B, the RSCP figure is maintained at the RSCP threshold value or less in the a period and the b period, such that the mobile transfer state release is determined. At this time, after the mobile transfer state release is determined according to the additional setting of the secondary condition, it confirms the RSCP figure received from the second mobile terminal 120 at the time when the previously set specific time (for example, 5 seconds) elapses. In FIG. 2, at the time when 5 seconds elapse after the mobile transfer state release is determined, it can be confirmed that the RSCP figure is the RSCP threshold value or less, and thus can be determined to progress the mobile transfer state release operation. On the other hand, in FIG. 3, at the time when 5 seconds elapse after the mobile transfer state release is determined, it can be confirmed that the RSCP figure is the RSCP threshold value or more, and thus can be determined to not progress the mobile transfer state release operation.

In addition, when the graph according to the RSCP figure received from the second mobile terminal 120 according to the second exemplary embodiment of the present invention is the same as one shown in FIGS. 4A and 4B, the mobile transfer state release is determined when the RSCP figure is maintained at the RSCP threshold value or less in the "a" period and the "b" period. At this time, according to the additional setting of the secondary condition, in FIG. 5, at the time when 5 seconds elapse after the mobile transfer state release is determined, it can be confirmed that the RSCP figure is the RSCP threshold value or less, and thus can be determined to progress the mobile transfer state release operation. In FIG. 6, at the time when 5 seconds elapse after the mobile transfer state release is determined, it can be confirmed that the RSCP figure is the RSCP threshold value or more, and thus can be determined to not progress the mobile transfer state release operation.

Figure 8:
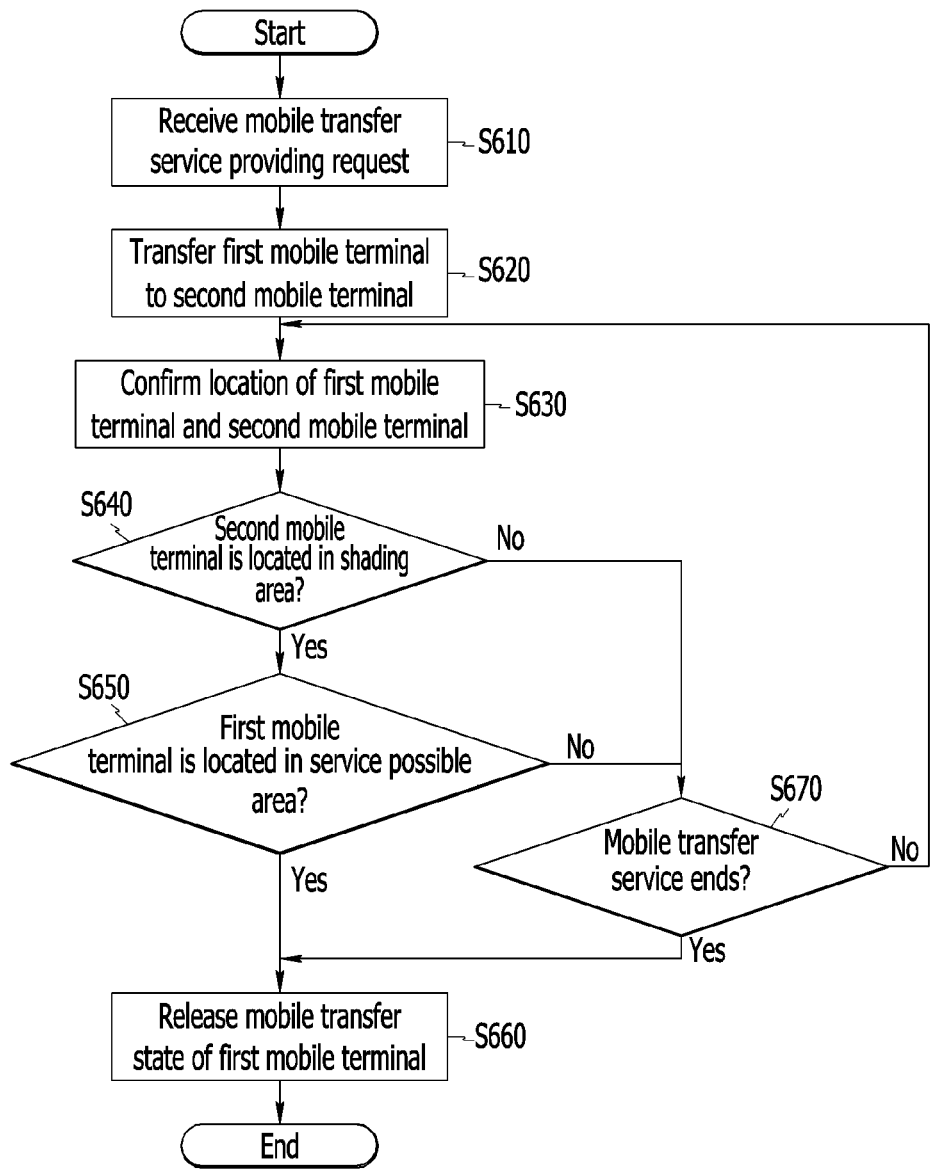
FIG. 8 is a flowchart for explaining a method for restoring a transferred mobile using location information of the first mobile terminal and the second mobile terminal according to a third embodiment of the present invention.

FIG. 8 is a flowchart for explaining a method for restoring a transferred mobile using location information of the first mobile terminal and the second mobile terminal according to a third embodiment of the present invention.

According to the third exemplary embodiment of the present invention, in order for the second mobile terminal 120 to request the mobile transfer service, and according to the second exemplary embodiment of the present invention, in order for the second mobile terminal 120 to request the mobile transfer service, the previously set mobile transfer service code and the telephone number (MSISDN) of the first mobile terminal 110 are input, and when the mobile transfer according to the input of the mobile transfer service code is set in the NPDB 180, steps S610 and S620 that provide the mobile communication services to be provided to the first mobile terminal 110 through the second mobile terminal 120 are the same as steps S310 and S320 described in FIG. 4, and therefore the detailed description thereof will be omitted.

When the mobile transfer service is provided, the first MSC 130 and the second MSC 140 confirm the locations of the first mobile terminal 110 and the second mobile terminal 120 to confirm whether the first mobile terminal 110 and the second mobile terminal 120 are located in the shadow area and the service possible area.

At this time, the first MSC 130 and the second MSC 140 interwork with the location based service server to confirm the location information of the first mobile terminal 110 and the second mobile terminal 120, thereby making it possible to confirm whether they are located in the shadow area and service possible area and when the RSCP figure received from the first mobile terminal 110 and the second mobile terminal 120 is a predetermined figure or less, are confirmed as being located in the shadow area, thereby making it possible to confirm the locations of the first mobile terminal 110 and the second mobile terminal 120. In addition to this, various methods that estimate the locations of the first mobile terminal 110 and the second mobile terminal 120, etc., by using the location information stored in the HLRs 150 and 160 through the location registration procedure of the mobile terminal can be used (S630).

When it is confirmed that the second mobile terminal 120 is located in the second MSC 140 through the location information confirmation, it requests the location information confirmation of the first mobile terminal 110 to the first MSC 130 (S640).

As a result of confirming the location information of the first mobile terminal 110 in the first MSC 130, when it is confirmed that the first mobile terminal 110 is located in the service possible area, it informs the second MSC 140 of the location information confirmation result (S650).

The second MSC 140 receiving the location information confirmation result generates the mobile transfer release request message and transmits it to the NPDB 180 through the second HLR 160, and the mobile transfer server 170 NPDB 180 and the NPDB 180 receiving the mobile transfer release command message release the MSISDN of the first mobile terminal 110 that is set in the second mobile terminal 120, such that the first mobile terminal 110 uses the mapping data of the normal MSISDN and IMSI to receive the mobile communication services (S660).

At steps S640 and S650, when the second mobile terminal 120 is located in the service possible area or both the second mobile terminal 120 and the first mobile terminal 110 are located in the shadow area, it continuously maintains the mobile transfer state and provides the mobile communication services to the second mobile terminal 120 to which the telephone number of the first mobile terminal 110 is mapped.

Meanwhile, when the code indicating the mobile transfer service release from the second mobile terminal 120 is input during the provision of the mobile transfer service, the input mobile transfer service release code is transferred to the NPDB 180 and the NPDB 180 releases the MSISDN of the first mobile terminal 110 that is set in the second mobile terminal 120, to perform the operation that performs the mobile transfer release (S670).

The above-mentioned exemplary embodiments of the present invention are not embodied only by an apparatus and method. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

According to the embodiment of the present invention, when the second mobile terminal in which the forwarding reception is set by the mobile transfer service is located in the shadow area for a predetermined time, it forcibly ends the mobile transfer service to automatically restore the first mobile terminal, thereby making it possible to prevent mobile communication service subscribers from missing important telephone calls, etc., which is caused when the mobile communication service subscribers do not receive the mobile communication services by not performing the restoring procedure. Therefore, the mobile communication service subscribers can alleviate concerns about a situation in which they cannot receive the mobile communication services such that they can confidently use the mobile transfer service.

The invention claimed is:

1. A method for restoring a first mobile terminal service that has been transferred to a second mobile terminal in a mobile transfer service receiving mobile communication services of a first mobile terminal through the second mobile terminal by setting a telephone number of the first mobile terminal to the second mobile terminal, the method for restoring a transferred mobile service comprising:
    (a) confirming power strength of a common pilot channel received from the second mobile terminal; and
    (b) releasing and restoring the mobile service transfer state of the first mobile terminal when the state where the power strength of the common pilot channel is a set threshold value or less is maintained for a set threshold time or more.

2. The method for restoring a transferred mobile service of claim 1, further comprising,
    prior to (a):
    receiving a request code for the mobile transfer service from the second mobile terminal and the telephone number of the first mobile terminal; and
    setting the telephone number of the first mobile terminal as the telephone number of the second mobile terminal and changing the service profile of the second mobile terminal to the service profile of the first mobile terminal to transfer the first mobile terminal service to the second mobile terminal.

3. The method for restoring a transferred mobile of claim 2, wherein
    (b) includes:
    releasing the telephone number of the first mobile terminal set in the second mobile terminal;
    activating each service profile of the first mobile terminal and the second mobile terminal; and
    providing each mobile communication service to the first mobile terminal and the second mobile terminal.

4. The method for restoring a transferred mobile of claim 1, wherein
    (b) includes:
    (b1) confirming that the state where the power strength of the common pilot channel is the threshold value or less is the set threshold time or more;
    (b2) reconfirming the power strength of the common pilot channel received from the second mobile terminal after the set specific time elapses; and
    (b3) when the reconfirmed power strength is the threshold value or less, releasing the mobile transfer state of the first mobile terminal, and if the reconfirmed power strength is the threshold value or more, repeatedly performing the process after (a).

5. A method for restoring a first mobile terminal service that has been transferred to a second mobile terminal in a mobile transferred service receiving mobile communication services of the first mobile terminal through the second mobile terminal by setting a telephone number of the first mobile terminal to the second mobile terminal, the method for restoring a transferred mobile comprising:
(a) confirming power strength of a common pilot channel received from a second mobile terminal; and
(b) releasing and restoring the mobile transfer service state of the first mobile terminal when it is confirmed through the power strength of the common pilot channel that the state where the second mobile terminal cannot receive mobile communication services exceeds a set threshold frequency within a set time unit.

6. The method for restoring a transferred mobile service of claim 5, wherein
(b) includes:
(b1) comparing the power strength with the set threshold value to confirm a period where the power strength is the threshold value or less;
(b2) confirming a frequency of the period where the power strength is the threshold value or less within the set time unit; and
(b3) releasing the mobile transfer state of the first mobile terminal when it is confirmed that the frequency of the period where the power strength is the threshold value or less exceeds the set threshold frequency.

7. The method for restoring a transferred mobile service of claim 5, further comprising,
prior to (a):
receiving a request code of the mobile transfer service from the second mobile terminal and the telephone number of the first mobile terminal; and
setting the telephone number of the first mobile terminal as the telephone number of the second mobile terminal and changing the service profile of the second mobile terminal to the service profile of the first mobile terminal to transfer the first mobile terminal service to the second mobile terminal.

8. The method for restoring a transferred mobile of claim 6, wherein
(b3) includes:
releasing the telephone number of the first mobile terminal set in the second mobile terminal;
activating each service profile of the first mobile terminal and the second mobile terminal; and
providing each mobile communication service to the first mobile terminal and the second mobile terminal.

9. The method for restoring a transferred mobile of claim 6, wherein
(b3) includes:
(b31) confirming that a frequency of a period of the threshold value or less exceeds the set threshold frequency;
(b32) confirming the power strength of the common pilot channel received from the second mobile terminal, after the set specific time elapses; and
(b33) releasing the mobile transfer state of the first mobile terminal, when the received power strength is the threshold value or less, and repeatedly performing the process after (a) when the received power strength is the threshold value or more.

10. A method for restoring a first mobile terminal service transferred to a second mobile terminal in a mobile transfer service receiving mobile communication services of the first mobile terminal through the second mobile terminal by setting a telephone number of the first mobile terminal to the second mobile terminal, the method for restoring a transferred mobile comprising:
(a) confirming locations of the first mobile terminal and the second mobile terminal; and
(b) releasing and restoring the mobile transfer state of the first mobile terminal when the first mobile terminal is located in a service possible area and the second mobile terminal is a shadow area,
wherein (a) includes determining that the first mobile terminal or the second mobile terminal is positioned in a shadow area when the power strength of the common pilot channel received from the first mobile terminal or the second mobile terminal is the previously set threshold value or less.

11. The method for restoring a transferred mobile of claim 10, wherein
(a) includes
confirming the location information of the first mobile terminal and the second mobile terminal by interworking with a home location register or a location based service server.

12. The method for restoring a transferred mobile of claim 10, wherein
(b) includes:
(b1) confirming the position of the second mobile terminal to confirm that the second mobile terminal is located in the shadow area;
(b2) confirming the location of the first mobile terminal to confirm that the first mobile terminal is located in the service possible area;
(b3) releasing the telephone number of the first mobile terminal set in the second mobile terminal;
(b4) activating each of service profiles of the first mobile terminal and the second mobile terminal; and
(b5) providing each mobile communication service to the first mobile terminal and the second mobile terminal.

13. A system for a mobile transfer service that sets a telephone number of a first mobile terminal to a second mobile terminal to provide mobile communication services of the first mobile terminal through the second mobile terminal, comprising:
a switching center that processes commands for providing the mobile transfer service and processes commands for ending the mobile transfer service by confirming power strength of a common pilot channel received from the transferred second mobile terminal or locations of the first mobile terminal and the second mobile terminal; and
a home location register that restores service profiles of the second mobile terminal transferred to service profiles of the first mobile terminal by the mobile transfer service and activates deactivated service profiles of the first mobile terminal according to a command for ending the mobile transfer service.

14. The mobile transfer system of claim 13, wherein
the home location register further includes
a unit that deactivates the service profile of the first mobile terminal or changes the service profile of the second mobile terminal to the service profile of the first mobile terminal according to the command for providing the terminal transfer service generated in the switching center.

15. The mobile transfer system of claim 13, further comprising:
a mobile transfer server that stores and manages the mobile transfer service subscriber information, receives a command for providing the mobile transfer service from the switching center to generate the mobile transfer command message, or receives a command for releasing the mobile transfer service to generate the mobile transfer releasing command message; and a number portability database that converts the mapping information of the MSISDN and the IMSI for the first mobile terminal and transmits it to the home location register according to the mobile transfer command message or the mobile transfer releasing command message that is transmitted from the mobile transfer server.

16. The mobile transfer system of claim 13, wherein the switching center generates the command for ending the mobile transfer service when the state where the power strength of the common pilot channel received from the transferred second mobile terminal is the threshold value or less of the power strength and is maintained for the threshold time.

17. The mobile transfer system of claim 13, wherein the switching center confirms that the frequency that the power strength of the common pilot channel received from the transferred second mobile terminal is the power strength threshold value or less in a set time unit, and when the confirmed frequency exceeds the threshold frequency, generates the command for ending the mobile transfer service.

18. The mobile transfer system of claim 13, wherein the switching center confirms the location information of the second mobile terminal and the first mobile terminal and generates the command for ending of the mobile transfer service when it is confirmed that the second mobile terminal is located in the shadow area and the first mobile terminal is located in the service possible area.

* * * * *